(12) United States Patent
Vadi et al.

(10) Patent No.: US 8,117,577 B1
(45) Date of Patent: Feb. 14, 2012

(54) DETERMINING TIMING PATHS WITHIN A CIRCUIT BLOCK OF A PROGRAMMABLE INTEGRATED CIRCUIT

(75) Inventors: Vasisht M. Vadi, San Jose, CA (US); Alvin Y. Ching, Sunnyvale, CA (US); Subodh Kumar, San Jose, CA (US); Richard D. Freeman, Soquel, CA (US); Ian L. McEwen, Golden, CO (US); Philip R. Haratsaris, Longmont, CO (US); Jaime D. Lujan, Louisville, CO (US); Eric M. Schwarz, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 452 days.

(21) Appl. No.: 12/361,516

(22) Filed: Jan. 28, 2009

(51) Int. Cl.
  *G06F 17/50* (2006.01)
  *G06F 9/455* (2006.01)

(52) U.S. Cl. ........ 716/108; 716/100; 716/101; 716/102; 716/103; 716/104; 716/105; 716/106; 716/107; 716/113; 716/116; 716/117; 716/134; 716/136; 703/13; 703/14

(58) Field of Classification Search .......... 716/100–108, 716/113, 116–117, 134, 136; 703/13–14
See application file for complete search history.

(56) References Cited

U.S. PATENT DOCUMENTS

| | | | | |
|---|---|---|---|---|
| 5,666,290 A * | 9/1997 | Li et al. | | 716/113 |
| 6,463,567 B1 * | 10/2002 | Kozai | | 716/103 |
| 7,346,479 B2 * | 3/2008 | Baez | | 703/14 |
| 7,356,793 B2 * | 4/2008 | Curtin et al. | | 716/108 |
| 7,747,973 B2 * | 6/2010 | Lin et al. | | 716/113 |

* cited by examiner

*Primary Examiner* — Nghia Doan
(74) *Attorney, Agent, or Firm* — Kevin T. Cuenot; Thomas George

(57) ABSTRACT

A computer-implemented method of identifying timing paths of a circuit block can include representing a circuit block including at least one bypassable component as a block diagram having a plurality of elements linked by nodes. The method can include generating a map file including a text description of each element within the block diagram, wherein the text description of each element specifies a bypass indicator for the element. The method also can include generating a plurality of sub-paths from the map file, determining timing paths from the plurality of sub-paths by selectively combining different ones of the plurality of sub-paths according to commonality of starting points and ending points of the plurality of sub-paths, and outputting the timing paths.

20 Claims, 3 Drawing Sheets

| Elements | Map File 125 |
|---|---|
| Register 205 | in.C reg.CREG_1 c.CLK r.RSTC ce.CEC node.Creg |
| Multiplexer 220 | in.C node.Creg mux.CREG.0.1 node.Cregout |
| Function Block 225 | node.Cregout in.X block node.sum |
| Register 210 | node.sum reg.ALWAYS c.CLK o.P |
| Register 215 | node.sum reg.ALWAYS c.CLK o.CO |

| | Input Sub-Paths | Internal Sub-Paths | Output Sub-Paths |
|---|---|---|---|
| 1 | in.C CREG_1 reg.CLK | node.Cregout ALWAYS node.sum | node.sum ALWAYS reg.CKL |
| 2 | in.RSTC CREG_1 reg.CLK | | |
| 3 | in.CEC CREG_1 reg.CLK | | |
| 4 | in.C CREG_0 node.Cregout | | |
| 5 | reg.CKL CREG_1 node.Cregout | | |
| 6 | in.x ALWAYS node.sum | | |
| 7 | reg.CKL ALWAYS o.P | | |
| 8 | reg.CKL ALWAYS o.CO | | |

FIG. 4

| Timing Paths 145 | |
|---|---|
| 1 | in.C CREG_1 reg.CLK |
| 2 | in.RSTC CREG_1 reg.CLK |
| 3 | in.CEC CREG_1 reg.CLK |
| 505 | in.C CREG_0_PREG_1 reg.CLK |
| 510 | reg.CLK CREG_1_PREG_1 reg.CLK |
| 515 | in.X PREG_1 reg.CKL |
| 7 | reg.CKL PREG_1 o.P |
| 8 | reg.CKL PREG_1 o.CO |

DETERMINING TIMING PATHS WITHIN A CIRCUIT BLOCK OF A PROGRAMMABLE INTEGRATED CIRCUIT

FIELD OF THE INVENTION

The embodiments disclosed herein relate to integrated circuit devices (ICs). More particularly, the embodiments relate to determining timing paths for a circuit block to be implemented within a programmable IC.

BACKGROUND

Integrated circuits (ICs) such as programmable ICs have become a popular platform for developing and prototyping IC designs. Programmable ICs refer to a type of IC that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAMs), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to, these devices, and further may encompass devices that are only partially programmable. For example, one type of programmable IC includes a combination of hard-coded transistor logic and a programmable switch fabric that programmably interconnects the hard-coded transistor logic.

Many programmable ICs include a variety of different types of circuit blocks. A "circuit block" can refer to a collection of components typically referred to, or thought of, as a single larger component by an end user of the programmable IC. For example, a BRAM, a DSP, and a CLB each is an example of a circuit block. These circuit blocks typically are highly configurable and include one or more components that can be bypassed depending upon the particular configuration of the circuit block that is selected by the end user of the programmable IC. With bypassable components, the number of timing paths through the circuit block and the delay of such timing paths can vary according to the configuration of the circuit block as determined by the data bits loaded into the programmable IC.

In order to provide the software development tools needed to implement circuit designs within programmable ICs, IC designers must document the timing paths within each circuit block within the programmable IC. Each timing path can be documented and added to a database that may be accessed by electronic design automation (EDA) tools, whether such tools are from the manufacturer of the programmable IC or other third party developers. End users of the EDA tools may then utilize the database of timing paths to analyze the timing of user specified designs that incorporate the circuit blocks.

Conventional analysis tools are unable to identify the various timing paths that may exist within a circuit block. This is particularly true of attribute sensitive timing paths, e.g., timing paths that conditionally exist according to whether components within the circuit block are bypassed given a user specified configuration of that circuit block. For example, commercially available static timing analysis tools are often unable to identify attribute dependent paths. In general, the static timing analysis tool must be run for each possible configuration of the circuit block. The number of combinations of attributes that specify the configuration of the circuit block can be significant and prohibitive in terms of manually trying to determine all possible configurations so as to identify all possible timing paths.

Thus, regardless of whether static timing analysis tools are used, IC designers are left with the daunting task of manually identifying timing paths of the circuit block based upon all possible configurations of the circuit block. Performing this analysis can be time consuming and tedious. Timing paths can be easily overlooked, particularly considering the complexity of modern circuit blocks and programmable ICs.

SUMMARY

The embodiments disclosed herein relate to determining attribute sensitive timing paths for a circuit block to be implemented within a programmable integrated circuit (IC). One embodiment of the present invention can include a computer-implemented method of identifying timing paths of a circuit block. The method can include generating a map file from a graphic representation of the circuit block. The map file can include a text description of each element of the graphic representation. The method can include generating a plurality of sub-paths from the map file, determining timing paths from the plurality of sub-paths by selectively combining different ones of the plurality of sub-paths according to commonality of starting points and ending points of the plurality of sub-paths, and outputting the timing paths. The combining of sub-paths described can be an iterative process.

Determining timing paths by selectively combining different ones of the plurality of sub-paths can include selecting a first sub-path having an ending point that is the same as a starting point of a second sub-path and combining the first sub-path with the second sub-path.

Generating a plurality of sub-paths can include generating at least one input sub-path including a starting point that is an input node of the circuit block, generating at least one internal sub-path including a starting point that is an internal node and an ending point that is an internal node of the circuit block, and generating at least one output sub-path including an ending point that is an output node or a register of the circuit block.

Generating a plurality of sub-paths also can include including a dependency condition within each sub-path. The text description of each element can specify, at least in part, a bypass indicator for the element. The dependency condition can be determined from the bypass indicator of an element within the sub-path. The dependency condition can specify a condition to be met for the sub-path to exist within the circuit block.

Determining timing paths by selectively combining different ones of the plurality of sub-paths can include identifying each sub-path including at least one of a starting point that is an internal node or an ending point that is an internal node as a timing path fragment and determining that each sub-path including a starting point that is either an input node or a register and an ending point that is either a register or an output node is a timing path. For each sub-path determined to be a timing path fragment, the method can include combining the sub-path with at least one other sub-path that is a timing path fragment to form a timing path.

The method can include classifying each timing path as a setup/hold timing path, a combinatorial timing path, a clock-to-output timing path, or a maximum frequency timing path. The method also can include associating each sub-path with an estimated delay and determining a delay for each timing path according to the delay of each sub-path that is combined to form the timing path. For each timing path, a dependency condition for the timing path can be determined according to the dependency condition of each sub-path combined to form the timing path.

Another embodiment of the present invention can include a computer-implemented method of identifying timing paths of a circuit block including selecting a block diagram including a plurality of elements connected by nodes, wherein the block diagram represents a circuit block including at least one bypassable component. A map file can be generated that includes a text description of each element within the block diagram. The text description of each element can specify, at least in part, a bypass condition for the element indicating when the element is bypassed within the circuit block according to user-specified attributes of the circuit block.

A plurality of sub-paths can be generated from the map file. Each sub-path can include a starting point, an ending point, a delay, and a dependency condition derived from the bypass condition of each element within the sub-path. The dependency condition can specify a condition that must be true for the sub-path to exist in the circuit block. The method can include determining whether each sub-path of the plurality of sub-paths is a timing path or a timing path fragment and selectively combining different ones of the plurality of sub-paths that are timing path fragments to form timing paths. For each timing path, the method can include calculating a delay for the timing path according to the delay of each sub-path within the timing path. The timing paths and corresponding delays can be output.

Determining whether each sub-path of the plurality of sub-paths is a timing path or a timing path fragment can include identifying each sub-path including at least one of a starting point that is an internal node or an ending point that is an internal node as a timing path fragment. Selectively combining different ones of the plurality of sub-paths that are timing path fragments can include selecting a first sub-path having an ending point that is the same as a starting point of a second sub-path and combining the first sub-path with the second sub-path.

Yet another embodiment of the present invention can include a computer program product including a computer-usable medium having computer-usable program code that, when executed identifies timing paths of a circuit block. The computer-usable medium includes computer-usable program code that generates a map file from a graphic representation of the circuit block, where the map file comprises a text description of each element within the block diagram. The medium also includes code that generates sub-paths from the map file, and that determines timing paths from the sub-paths by selectively combining different ones of the sub-paths according to commonality of starting points and ending points of the sub-paths. In addition, the medium also includes code that outputs the timing paths.

BRIEF DESCRIPTION OF THE DRAWINGS

FIG. 3 is a table illustrating map file generation in accordance with another embodiment of the present invention.

FIG. 4 is a table illustrating sub-paths that have been determined from a map file in accordance with another embodiment of the present invention.

DETAILED DESCRIPTION OF THE DRAWINGS

Figure 1:
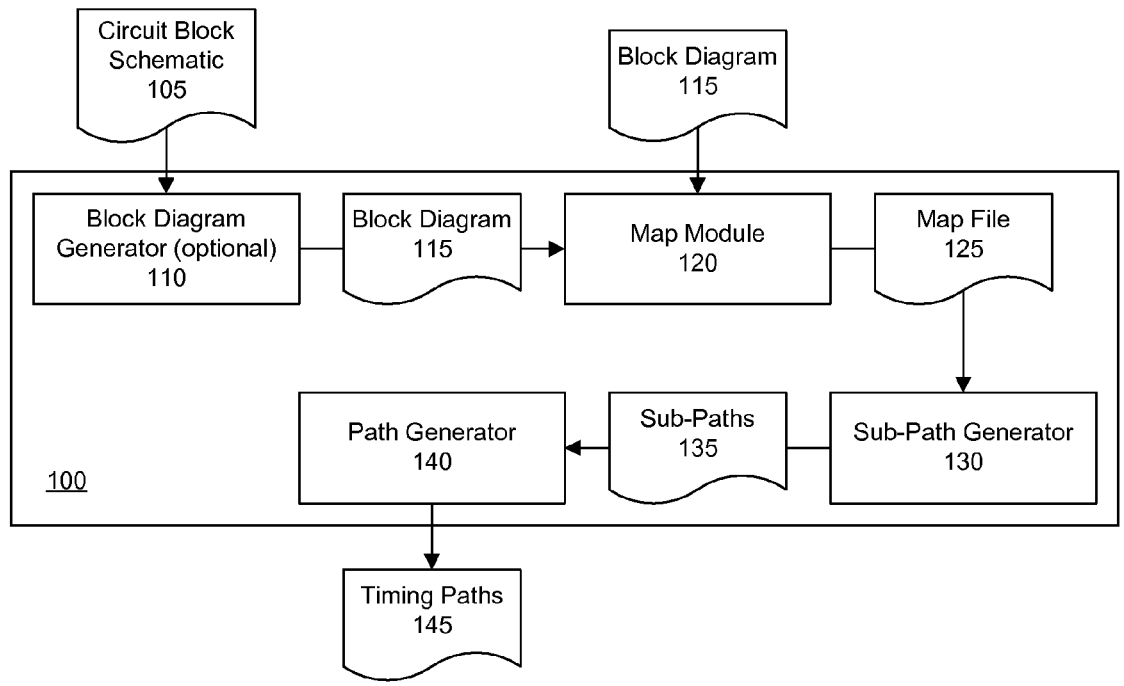
FIG. 1 is a block diagram illustrating a system for identifying timing paths within a circuit block of a programmable IC in accordance with one embodiment of the present invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to determining attribute sensitive timing paths within a circuit block of a programmable integrated circuit (IC). As used within this specification, the term "attribute" can refer to a setting of a circuit block to which a value may be assigned. Depending upon the value assigned to the attribute, the physical configuration of the circuit block, as implemented within the programmable IC, will vary. That is, the electrical circuit that is implemented within the programmable IC, e.g., in terms of signal paths, which components may be bypassed, or the like, will vary according to the values assigned to the attributes responsible for configuring the circuit block. From time-to-time within this specification, the term "attribute" may be used in reference to a particular attribute and the value that is assigned to that particular attribute.

Some circuit blocks implemented within a programmable IC have one or more components that may be bypassed given a particular configuration of the circuit block. This means that different signal paths or "timing paths" through the circuit block will exist based upon values assigned to attributes that control the configuration of the circuit block as specified within the configuration data loaded into the programmable IC. Whether such components are bypassed can change the number of timing paths within the circuit block and also vary the delay of those timing paths. The embodiments disclosed within this specification provide a mechanism for exhaustively identifying timing paths of a circuit block of a programmable IC and for reporting the delay of each identified timing path. It should be appreciated that the embodiments disclosed herein may be used to analyze circuit blocks regardless of whether such circuit blocks have bypassable components.

In accordance with one aspect of the present invention, a circuit block can be represented as a block diagram. The block diagram is a simplified format that represents the circuit block using a limited set of elements intended to model the timing paths of the circuit block. From the block diagram, a plurality of sub-paths can be determined. Each sub-path can represent a fragment or portion of a timing path and further can be associated with a delay. In some cases, a sub-path can be equivalent to a timing path, as will be described in further detail within this specification. In any case, the sub-paths can be combined through an iterative process based upon established criteria to produce an exhaustive list of the timing paths of the circuit block. The delay of each sub-path that is combined to form a timing path can be summed to produce a delay for the resulting timing path.

The embodiments disclosed within this specification can be implemented in the form of computer-usable program code, e.g., program code or a program, executing within a computer. A computer suitable for storing and/or executing program code can include at least one processor coupled directly or indirectly to memory elements through a system bus. The memory elements can include local memory employed during actual execution of the program code. The memory elements also can include bulk storage and cache memories. For example, cache memories can provide temporary storage of at least some program code in order to reduce the number of times code must be retrieved from bulk storage during execution.

Input/output (I/O) devices such as, for example, keyboards, displays, pointing devices, microphones, speakers, disk storage devices, tape storage devices, and other memory devices can be coupled to the computer either directly or through intervening I/O controllers. Network adapter(s) may also be coupled to the computer to enable the computer to become coupled to other computers, remote printers, storage devices, etc., through intervening private or public networks. Modems, cable modems, and Ethernet cards are just a few of the currently available types of network adapters.

FIG. 1 is a block diagram illustrating a system 100 for identifying timing paths within a circuit block of a programmable IC in accordance with one embodiment of the present invention. System 100 can include an optional block diagram generator 110, a map module 120, a sub-path generator 130, and a path generator 140. System 100, as noted, can be implemented in the form of computer-usable program code executing within a computer. Like reference characters and numbers will be used to refer to the same items throughout this specification.

The phrase "circuit block," as used herein, refers to a circuit or sub-circuit available within a programmable IC that is predetermined. The circuit can be parameterizable. A circuit block may be classified as either a "Black Box" or a "White Box" type of circuit block. A Black Box type of circuit block typically is described only as a function of the external pins of the circuit block, whereas the internal paths of White Box types of circuit blocks are revealed. The embodiments described within this specification can be applied to both Black Box type circuit blocks and White Box type circuit blocks. An example of a Black Box type circuit block can include a digital signal processing (DSP) block. An example of a White Box type circuit block can include a configurable logic block.

The information that is gathered in terms of defining the timing specification for a circuit block will differ according to whether the circuit block is a Black Box or a White Box type circuit block. For example, the end result for a Black Box type of circuit block analysis can combine internal timing paths until timing data describing the interface for the Black Box, e.g., parameters such as clock-to-hold and maximum frequency are determined. By comparison, within a White Box type circuit block, the timing for each basic circuit element of that circuit block should be made available within the timing specification, as opposed to just the timing of the interface of the circuit block. Accordingly, in some cases, when the individual timing paths among the basic circuit elements of a White Box type circuit block are obtained and the interface timing is not required, the techniques described herein may be discontinued. For a Black Box type circuit block, the individual timing paths can be iteratively combined, as will be described herein, to derive the timing characteristics of the circuit block at the interface that will be exposed to end users.

An end user of the programmable IC may programmatically assign one or more values to various attributes of the circuit block by loading configuration data into the programmable IC. The attributes, and values assigned thereto, dictate the particular configuration of the circuit block when implemented within an end user circuit design within the programmable IC. Typically, although not always the case, the circuit block will have one or more components that may be bypassed depending upon the values of attributes assigned to the circuit block. In this regard, the number of timing paths within the circuit block will vary according to the values of the attributes. Further, the timing, e.g., delays, of such timing paths will vary according to those attribute values. The phrase "timing path" refers to a signal path within the circuit design that begins at either an input to the circuit block or a register and ends at either an output of the circuit block or a register.

In one embodiment, system 100 can receive a circuit block schematic 105 specifying a circuit block within block diagram generation module 110. Circuit block schematic 105 may be implemented in any of a variety of different programmatic formats, e.g., an actual graphic schematic diagram, a netlist, or a collection of one or more hardware description language files. Circuit block schematic 105 specifies the actual components and signals, e.g., circuitry, that form the circuit block being processed. In this regard, circuit block schematic 105 can specify the full functionality of the circuit block.

Block diagram generation module 110 can translate circuit block schematic 105 into a block diagram 115, which can be output and provided to map module 120. As used herein, "outputting" and/or "output" can mean, for example, writing to a file, storing in memory, writing to a user display or other output device, sending or transmitting to another system, exporting, or the like.

In another embodiment, an IC designer can manually generate block diagram 115 from circuit block schematic 105. Accordingly, block diagram generator 105 is pictured in FIG. 1 as being "optional." In any case, particular processes and rules observed to derive block diagram 115 from circuit block schematic 105, whether performed automatically or manually by an IC designer of the circuit block being analyzed, will be the same.

In general, block diagram 115 represents a simplified version of the circuit block specified by circuit block schematic 105. Block diagram 115 is a representation of the circuit block that uses a limited set of elements and nodes to represent timing paths of the circuit block without enabling or representing the full functionality of the circuit block. That is, block diagram 115 need only reflect timing paths, not functionality of the circuit block. As an example, within a schematic block diagram, a block may consist of a multiplier, an adder, and/or a memory element. In terms of calculating timing paths, a multiplier, an adder, and/or a memory element each, or collectively, may be treated as a "block" with generic functionality. In other words, block diagram 115 only represents a network of connections between blocks and the timing model. Timing paths do not depend on the actual circuit design implementation or upon what function the block performs.

In another embodiment, block diagram 115 may be implemented as an abstraction of the actual circuit function. For example, within block diagram 115, a bus of <N:0> bits can be represented as a single wire if, for the purpose of timing analysis, all elements of the bus can be modeled the same way. In this manner block diagram 115 can be constructed to reflect the intended timing model of the circuit block.

In one embodiment, block diagram 115 can include three different types of nodes. Nodes, in general, represent signals received by an element of block diagram 115 or output from an element of block diagram 115. These different types of nodes include input nodes, output nodes, and internal nodes. An input node refers to a signal that is received by an element within the circuit block from a location external to the circuit block. An output node refers to a signal that is output from an element within the circuit block to a location external to the circuit block. Within some circuit blocks, however, an output node may feed back to another input node, such as in the case of an accumulator within a DSP block. An internal node refers to a signal that exists entirely within the circuit block and is neither an input node nor an output node.

The elements of block diagram 115 can be represented as one of a limited number of circuit components. In one embodiment, the set of elements that can be used can include registers, blocks, and multiplexers. In another embodiment, other types of elements, such as latches, can be used. For example, whenever registers are noted, latches or other clocked elements may be used as an alternative. Blocks can be used as a generic element that can represent different types of combinatorial circuit elements.

In general, the elements within block diagram 115 may have input signals and output signals represented as nodes. Using registers, multiplexers, and blocks allows all possible timing paths of the circuit block to be represented in block diagram 115 in an intuitive manner that can be more easily understood by an IC designer. A register can represent a clocked circuit component of the circuit block. A block can represent a complex function and, therefore, may represent a plurality of circuit components including combinatorial logic. A multiplexer can represent components that control branching of timing paths within the circuit block.

Block diagram 115 can be output to map module 120. Map module 120 can generate an HDL netlist from block diagram 115 and convert that netlist into a map file 125. Map file 125 can be formatted using an internal notation which includes a text description of each element of block diagram 115. Map module 120 can output map file 125, which can be received by sub-path generator 130. It should be appreciated that in another embodiment, circuit block schematic 105 may be processed directly to produce map file 125 without having to produce an intermediate output in the form of block diagram 115 and/or HDL netlist.

Sub-path generator 130 can identify various types of sub-paths within map file 125. In one embodiment, sub-path generator 130 can identify input sub-paths, internal sub-paths, and output sub-paths to be described within this specification in further detail. In general, however, each sub-path can have a starting point that is an input node, a register, or an internal node and include an ending point that is an output node, a register, or an internal node. Each sub-path defines a fragment of a timing path or a "timing path fragment." As noted, however, some sub-paths are equivalent to timing paths, e.g., are not timing path fragments. Each sub-path further may be associated with, or include, an attribute dependency list that indicates the particular user-specifiable attributes and corresponding values for the circuit block that dictate whether the sub-path is bypassed. The attribute dependency list specifies each user specifiable attribute, and corresponding value, that determines whether the sub-path exists within a given user-specified configuration of the circuit block. Accordingly, sub-path generator 130 can output a list of sub-paths 135, with each sub-path optionally being associated with an attribute dependency list.

Each sub-path also can be associated with a delay. Delay information for each sub-path can be determined from any of a variety of different sources. For example, an IC designer can add delay information to circuit block schematic 105 by annotating delays upon circuit components and connections between circuit components. That delay information can be carried forward and annotated on the appropriate elements and nodes of block diagram 115. When a sub-path is determined from block diagram 115, the delays for elements and/or nodes of a given sub-path can be summed to yield a delay for the sub-path. In another example, the IC designer can annotate nodes and elements of block diagram 115 with delay information. Such information, as noted, can be carried forward with the appropriate sub-paths 135.

Sub-paths 135 can be provided to path generator 140. Path generator 140 can combine different ones of sub-paths 135 to form a plurality of timing paths 145 that can be output as a list. Generally, sub-paths 135 can be combined according to commonality of the starting points and/or ending points of each respective sub-path. Path generator 140 can iteratively combine sub-paths 135 until each resulting timing path falls into one of four different categories or classes. These classes include setup/hold timing paths, combinatorial timing paths, clock-to-output timing paths, and maximum frequency ($F_{max}$) timing paths.

A setup/hold timing path refers to a timing path that has an input node as a starting point and a register as an ending point. A combinatorial timing path refers to a timing path that has an input node as a starting point and an output node as an ending point. A combinatorial timing path includes no clocked components, e.g., registers between the starting point and the ending point. A clock-to-output timing path refers to a timing path that has a register as a starting point and an output node as an ending point. A maximum frequency path refers to a timing path that has a register as a starting point and another register as the ending point. The starting point and the ending point of a maximum frequency path will be clocked by the same clock. Maximum frequency paths, therefore, are internal timing paths. By combining sub-paths 135 to form timing paths 145, each resulting timing path will have a starting point that is either an input node or a register and an ending point that is either an output node or a register.

In one aspect of the invention, timing paths between asynchronous clocks are not checked. In the case of two clock domains with asynchronous clocks, the timing paths within each respective clock domain would be checked independently of the timing paths of the other clock domain. For example, consider the case of a dual port block random access memory (BRAM) having a write port that runs at a clock frequency that is asynchronous with respect to the frequency of the clock controlling the read port. In such a circuit block, paths from the input through to the output would not be evaluated due to the write port and the read port operating at asynchronous frequencies. Each clock domain could, however, be checked independently. That is, a first clock domain including the write port may be checked. A second clock domain including the read port may be checked in a separate process that is independent of the first clock domain. By comparison, in other circuit blocks and alternate embodiments where multiple clocks run at different frequencies that are synchronous, e.g., where one is a multiple of the other, the timing path from the input through to the output may be evaluated as a timing path.

When two or more sub-paths are combined to form a timing path, the delay of each sub-path being combined can be summed to yield a delay for the timing path. In this manner, the delay information can be carried forward from a graphical representation of the circuit block, whether in the form of circuit block schematic 105 or block diagram 115, so that each resulting timing path is associated with a delay.

Figure 2:
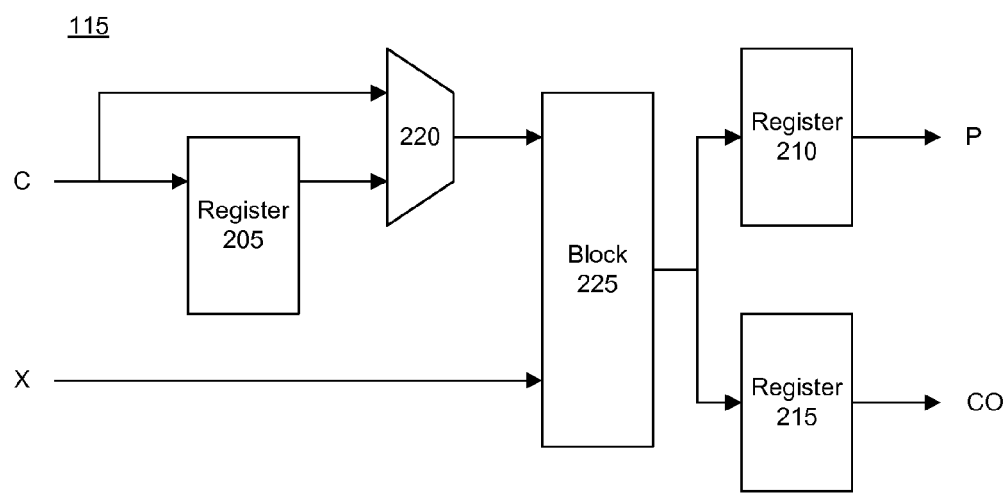
FIG. 2 illustrates an example of a block diagram as described with reference to FIG. 1 in accordance with another embodiment of the present invention.

FIG. 2 illustrates an example of block diagram 115 described with reference to FIG. 1 in accordance with another embodiment of the present invention. As noted, block diagram 115 is a generalized translation of a circuit block schematic that represents timing paths. Accordingly, block diagram 115 includes only elements specified as registers, multiplexers, or blocks, with such elements having inputs and outputs specified in the form of input nodes, internal nodes, and output nodes. Thus, as shown, block diagram 115 includes elements including registers 205, 210, and 215, multiplexer 220, and block 225, which are connected by a plurality of nodes.

In creating block diagram 115 from a circuit block schematic, various translation rules must be observed. For example, registers can be driven by a clock signal. Signals such as the reset signal and the clock enable signal, however, can be optional. For purposes of illustration, it can be assumed that register 205 is driven by a clock signal, a reset signal, and a clock enable signal (not shown). In this example, registers 210 and 215 can be driven by the same clock signal as register 205, but lack clock enable signals and reset signals.

As pictured in FIG. 2, block diagram 115 includes input signals "C" and "X" and output signals "P" and "CO." Accordingly, register 205 has an input node corresponding to input signal "C." Registers 210 and 215 have output nodes corresponding to output signals "P" and "CO" respectively. Multiplexer 220 and block 225, which may be an adder in this example, have internal nodes corresponding to signals received and/or output. Multiplexer 220 further has an input node corresponding to input signal "X."

It should be appreciated that FIG. 2 presents a simplified example for purposes of illustration only. The embodiments disclosed within this specification may be applied to more complex circuit blocks such as a DSP48, for example, or other similarly complex circuit blocks as are available within Virtex® 5 FPGAs available from Xilinx Inc. of San Jose, Calif. or within other programmable ICs.

From block diagram 115, it can be seen that depending upon the state of multiplexer 220, input signal "C" will either pass through register 205 or bypass register 205. In this regard, register 205 may be referred to as "bypassable." Each of the elements of block diagram 115 can be associated with a particular attribute that indicates whether the node can be bypassed. Registers 210 and 215 are not bypassable and, in one embodiment, can be associated with an attribute indicating that condition. In an alternative embodiment, registers, or other elements, that are not bypassable may include no attribute. The lack of an attribute can be interpreted as an "indicator" that such elements may not be bypassed.

FIG. 3 is a table illustrating an example of map file 125 described with reference to FIGS. 1 and 2 in accordance with another embodiment of the present invention. For purposes of illustration, it can be assumed that map file 125 is generated from block diagram 115 described with reference to FIG. 2. In general, map file 125 can include a textual description for each element of the block diagram. Further, map file 125 can use the following syntax for each element description: <input node> <bypass indicator> <clock signal> <reset signal> <clock enable signal> <output node>. The clock signals, however, are present only for registers. Further, the reset signal and the clock enable signal are optional signals for registers.

In general, map file 125 can follow a naming convention in which the type of node forming the input signal, internal signal, or output signal can be described using a term prior to a period (.). The term following the period can specify the name of the node as determined from the particular graphic representation of the circuit block that is being processed. For example, an input signal of an element can be specified using the syntax "in.<name>," where <name> is the signal name. An output signal of an element can be specified using the syntax "o.<name>," where <name> is the signal name. A clock signal can be specified as "c.<name>." The reset signal can be specified as "r.<name>." The clock enable signal can be specified as "ce.<name>." An internal signal, e.g., an internal node, can be designated as "node.<name>."

Turning to elements of the block diagram, each register will include a single input signal, a single output signal, a clock signal, an optional reset signal, and an optional clock enable signal. In illustration, the textual description for register 205 is "in.C reg.CREG_1 c.CLK r.RSTC ce.CEC node-.Creg." The textual description of register 205 indicates that the element has an input node of "C" indicated by "in.C," a clock signal of "CLK" as indicated by "c.CLK," a reset signal of "RSTC" as indicated by "r.RSTC," a clock enable signal of "CEO," as indicated by "ce.CEC," and an output to an internal node of the circuit block named "Greg" as indicated by "node.Creg."

Each register also can include a bypass indicator that specifies the condition(s) for bypassing the register within the circuit block. The bypass indicator, which is "reg.CREG_1," indicates that the description is for a register and also specifies the bypass indicator has a value of "1." For purposes of illustration, a value of "1" for the bypass indicator, which is indicated in this example as "CREG_1," indicates that the element is not bypassed. A bypass indicator specified as "CREG_0" would indicate that the element is bypassed.

As noted, the circuit block used within this specification has been simplified for ease of illustration. In another example of the types of attributes that may be included, some circuit blocks may be programmed to use 0, 1, or 2 stages of pipelined registers on an input. Accordingly, each register of such a circuit block would include a bypass indicator specifying whether the register was in the signal path or not based upon the configuration of the circuit block, e.g., the values of attributes specifying the depth of pipelining to be used.

Each multiplexer will include a plurality of input signals, a single output signal, and a bypass indicator. From FIG. 2, it can be seen that multiplexer 220 receives two input signals: "C" and a signal output from register 205. As noted, the term "in" indicates that the signal is an input to the circuit block, e.g., an input node, whereas the term "node" indicates that the signal is internal to the circuit block, e.g., an internal node. Accordingly, the input signals to multiplexer 220 can be represented in the text description of multiplexer 220 within map file 125 as "in.C node.Creg." Here, the expression "node.Creg" indicates that the signal output from register 205 for signal "C," e.g., an internal node, is supplied as an input to multiplexer 220. The expression "in.C" indicates that the other input signal to multiplexer 220 is the unregistered input signal "C."

The bypass indicator "mux.CREG.0.1" indicates that the element is a multiplexer due to the term "mux" preceding the period. The term "CREG.0.1" indicates the condition that controls whether multiplexer 220 passes unregistered input signal "C" or the output from register 205. The bypass indicator of multiplexer 220 specifies that multiplexer 220 selects one of the two input signals according to the value assigned to "GREG," which references the bypass indicator of register 205. The output signal of multiplexer 220 is represented within the text description as "node.Cregout." Since the output signal of multiplexer 220 is an internal node of the circuit block, the term "node" is used. The name "Cregout" refers to the output signal of multiplexer 220.

Blocks can receive one or more input signals and generate one or more output signals. The number of input signals and the number of output signals need not be the same. The number of input signals to the block may exceed the number of output signals from the block or vice versa. A block can be used to represent circuit components such as multipliers, adders, a combinatorial logic block, a memory, or any other circuit function that can be abstracted to a block with some integer number of inputs and outputs which, for the purposes of timing analysis, can be treated as a black box. A block may or may not have any attribute dependencies.

When a logic block has multiple attribute dependencies, these blocks can be split into separate blocks placed serially in the block diagram. Alternatively, such blocks may be split and placed in parallel or split and placed in a configuration that is both parallel and serial. One example of this situation can be a dual port BRAM that has an Error Correction Code (ECC) read only mode and an ECC write only mode. The timing for each of the modes can differ. The two modes, e.g., configurations, can be represented in the block diagram as a first block and multiplexer combination representing the read mode and a second block and multiplexer combination representing the write mode. Although the actual hardware, e.g., the dual port BRAM, includes only one module that is configured in one of two different modes, for purposes of timing analysis, the ECC may be represented one time for each possible configuration, e.g., a non-ECC mode, an ECC read only mode, an ECC write only mode, and a full ECC mode.

Another example involving the dual port BRAM refers to the main memory core which may have different timing depending upon the mode, or configuration, selected. If one port of the dual port BRAM is in write mode and set to "READ_FIRST," and the second port is set to "WRITE_FIRST" or "NO_CHANGE," then the ports can be represented in the block diagram differently than the ports would physically exist as implemented within the programmable IC. For example, the dual port BRAM can be represented as two independent memory blocks, one for each of ports A and B, despite the physical dual port BRAM having a single memory block shared by both ports.

Continuing with FIG. 3, block 225 can include two input signals and a single output signal that feeds two different registers. One input signal to block 225, being an internal node, is denoted within the text description as "node.Cregout" which corresponds to the signal output from multiplexer 220. The other input signal to block 225, which is the input signal X, can be represented as "in.X." The term "block" can indicate that the description is for a block. The output of block 225, which in this example may represent an adder block, is specified as "node.sum."

Registers 210 and 215 are similar in that each receives a same input signal denoted as "node.sum," which corresponds to the signal output from block 225. Again, the term "node" indicates that the signals input to registers 210 and 215 are internal to the circuit block. The bypass indicator "reg.ALWAYS" indicates that the element is a register. The bypass attribute of the register indicates that the register is not bypassable. Register 210, which generates output signal "P" includes the term "o.P," indicting that the output signal "P" is output from register 210 to a location external to the circuit block. Each of registers 210 and 215, being clocked, includes a clock signal denoted as "c.CLK." Registers 210 and 215, in this example, do not have reset signals or clock enable signals. As noted, the "o" indicates that the signal is an output of the circuit block. Similar to register 230, register 235, which generates output signal "CO," includes the term "o.CO."

FIG. 4 is a table illustrating sub-paths that have been determined from a map file in accordance with another embodiment of the present invention. More particularly, FIG. 4 illustrates sub-paths 135 generated from map file 125 described with reference to FIGS. 1-3. As shown, the sub-paths that are generated include input sub-paths, internal sub-paths, and output sub-paths. As noted, while some sub-paths may specify a timing path, in general, each sub-path represents a portion or fragment of a timing path within the circuit block being analyzed. Though not shown, each sub-path will be associated with a delay.

The sub-paths can be generated based upon characteristics of the various elements described with reference to FIG. 3. The following discussion provides a guide as to how each component from map file 125 of FIG. 3 is processed to derive the various sub-paths illustrated in FIG. 4. A block, as noted, can include one or more inputs and one or more outputs. Each input will have a path to each output. Each path represents a combinatorial path. Each block may or may not be conditional. A multiplexer will have a plurality of inputs and a single output. Each input will have a path to the output. A multiplexer will, in nearly every case, be conditional.

Registers pose a special case in which the data input is viewed as terminating at the register itself. The output from a register is treated as a new path originating from the register. A clock on a register serves as a reference for the clock domain. A clock enable for a register is handled as an additional input that terminates at the register. A synchronous reset or set also can be handled as an input that terminates at the register. An asynchronous reset or set can trigger additional recovery and removal timing constraints that are analogous to setup and hold.

An input sub-path can refer to a timing path fragment that has a starting point that is either an input node or a register. An input sub-path will have an ending point that is a register, an internal node, or an output node. An internal sub-path can refer to a timing path fragment that has a starting point that is an internal node and an ending point that is an internal node. An output sub-path can refer to a timing path fragment that has a starting point that is an internal node and ending point that is an output node or a register. In addition to a starting point, an ending point, and a delay, each sub-path will specify a dependency condition that indicates the conditions necessary for that sub-path to exist within the circuit block.

Input sub-paths 1-8 reflect the different sub-paths that can be extracted from map file 125 that have a starting point that is an input node or a register and an ending point that is a register, an internal node, or an output node. Input sub-paths 1-3 represent those sub-paths relating to input signals provided to register 205, and thus, are relevant when register 205 is not bypassed. Accordingly, each of input sub-paths 1-3 includes a dependency condition indicating when the sub-path exists. The dependency condition is specified as "CREG_1" indicating that each of input sub-paths 1-3 exist when the input signal "C" is registered, e.g., when register 205 is not bypassed.

For example, input sub-path 1 has a starting point of input signal "C" as the input to register 205 when register 205 is not bypassed. Because each register is clocked, sub-path 1 has an ending point of the register itself, e.g., register 205. This is indicated by the "reg.CLK" expression. Input sub-path 2 represents the reset signal that is provided to register 205 when not bypassed. Accordingly, input sub-path 2 has a starting point of "in.RSTC" corresponding to the reset signal of register 205 and an ending point of "reg.CLK." Input sub-path 3, which represents the clock enable signal of register 205, has a starting point of "in.CEC" and an ending point of "reg.CLK."

Input sub-path 4 represents the input sub-path that exists when the input signal "C" is not registered, e.g., when register 205 is bypassed. Accordingly, input sub-path 4 includes a dependency condition of "CREG_0" indicating that the sub-path exists only when input signal "C" is not registered. As shown, input sub-path 4 has a starting point of "in.C" and an ending point of "node.Cregout," which corresponds to the internal node that represents the input to block 225.

Input sub-path 5 represents the sub-path from register 205 to the input of block 225. As shown, input sub-path 5 has a starting point of "reg.CLK" indicating the register itself. The ending point of sub-path 5 is "node.Cregout," which corresponds to the input of block 225. The dependency condition of input sub-path 5 indicates that input sub-path 5 exists only when input signal "C" is registered.

Input sub-path 6 represents the sub-path from input signal "X" to the output of block 225, which is an internal node specified as "node.sum." In this example, the dependency condition is specified as "ALWAYS." This term is an example of a symbol or shorthand for indicating that input sub-path 6 will always exist no matter the particular configuration specified for the circuit block. That is, input sub-path 6 is not conditional. Any constant can be selected as a placeholder. The term "ALWAYS" has been used for purposes of illustration only. Accordingly, input sub-path 6 has a starting node of "in.X" and an ending node of "node.sum."

Input sub-path 7 represents the sub-path from register 210 to the output signal "P." In this example, since register 210 is not bypassable, the dependency condition is specified as "ALWAYS." Input sub-path 7 has a starting point of "reg.CLK" and an output node of "o.P." Similarly, input sub-path 8 represents the portion of the timing path from register 215 to output signal "CO." The dependency condition of "ALWAYS" indicates that input sub-path 8 will always exist since register 215 cannot be bypassed. Input sub-path 8 has a starting point of "reg.CLK" and an ending point of "o.CO." It should be appreciated that in other embodiments, various combinations of bypassable and non-bypassable registers and/or latches may exist within the circuit block and be supported using the analysis techniques described within this specification.

Internal sub-path 1 reflects the sub-path that can be extracted from map file 125 that has a starting point that is an internal node and an ending point that is an internal node. More particularly, internal sub-path 1 represents a portion of a timing path having a starting point at the output of multiplexer 220 represented as "node.Cregout" and an ending point of "node.sum," which represents the output of function block 225. As shown, the dependency condition, specified as "ALWAYS," indicates that internal sub-path 1 is not conditional, e.g., always exists within the circuit block.

Output sub-path 1 reflects the sub-path that can be extracted from map file 125 that has a starting node that is an internal node and an ending node that is a register or an output node. In particular, output sub-path 1 represents a portion of a timing path having a starting point of "node.sum" and an ending node of reg.CLK." The dependency condition for output sub-path 1, as shown, is "ALWAYS."

Since both registers 210 and 215 are clocked by the same clock and receive the same input signal, there is no need to represent each as a separate and independent sub-path as the timing characteristics of each sub-path will be the same or nearly identical. As the purpose of tracing the timing paths through the circuit block is to provide an exhaustive list of timing paths and delays for those timing paths, there is no need to represent two sub-paths having essentially identical delays. Rather, the two sub-paths may be represented as a single sub-path, e.g., output sub-path 1. When the sub-paths are annotated with delays, the delay information can be taken into account to select the worst case timing path when multiple equivalent timing paths are found, to treat them as identical, or to list each timing path separately depending upon the particular application for which analysis is being performed.

As noted, the sub-paths can be iteratively combined based upon commonality of starting point and/or ending point until all sub-paths are resolved to one of the four different classes of timing paths, e.g., a setup/hold timing path, a combinatorial timing path, a clock-to-output timing path, or a maximum frequency timing path. Input sub-paths 1-3, which have input nodes as starting points and registers as ending points are already resolved to being setup/hold timing paths and need no further processing. Similarly, input sub-paths 7 and 8, which have registers as the starting points and have output nodes as ending points, are already resolved to being clock-to-output timing paths and need no further processing.

Input sub-paths 4-6, internal sub-path 1, and output sub-path 1, however, represent timing path fragments since these sub-paths do not fall within one of the four different categories of timing paths. In particular, each of input sub-paths 4-6, internal sub-path 1, and output sub-path 1 begins or ends with an internal node. Thus, these sub-paths can be combined with other sub-paths until no further sub-paths exist that begin or end with an internal node.

Figures 5, 6:
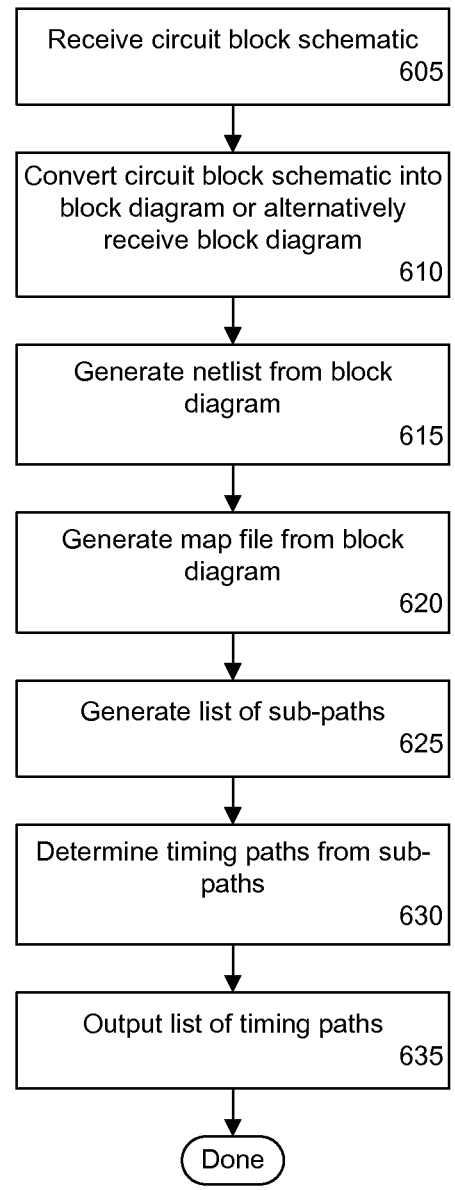
FIG. 5 is a table illustrating timing paths that have been determined from a plurality of sub-paths in accordance with another embodiment of the present invention.
FIG. 6 is a flow chart illustrating a method of determining timing paths within a circuit block of a programmable IC in accordance with another embodiment of the present invention.

FIG. 5 is a table illustrating timing paths that have been determined from a plurality of sub-paths in accordance with another embodiment of the present invention. More particularly, FIG. 5 illustrates timing paths 145 that can be formed from the sub-paths 135 described with reference to FIGS. 1-4. The left-hand column indicates those input sub-paths from FIG. 4 that were complete and needed no further processing. As shown, input sub-path 1, 2, 3, 7, and 8 are listed as timing paths as each conformed to one of the four classes of timing paths. In this case, each of sub-paths 1, 2, 3, 7, and 8 begins with either an input node or a register and ends with either a register or an output node.

Timing path 505 is created by linking those sub-paths that have common internal nodes. For example, input sub-path 4 has an ending point of "node.Cregout," which is the same as the starting point of internal sub-path 1. Internal sub-path 1 has an ending point of "node.sum," which is the same as the starting point of output sub-path 1. Accordingly, input sub-path 4, internal sub-path 1, and output sub-path 1 can be combined to create timing path 505. Reviewing timing path 505, it can be seen that the dependency condition of each sub-path that is combined is carried forward in the final expression of timing path 505. That is, the dependency of each sub-path is included within the timing path to form a dependency condition for the timing path. Since timing path 505 begins with an input node and terminates with a register, timing path 505 can be classified as a setup/hold timing path and requires no further processing.

Timing path 510 is created in similar fashion. Input sub-path 5 has an ending point of "node.Cregout," which is the same as the starting point of internal sub-path 1. Internal sub-path 1 has an ending point of "node.sum," which is the same as the starting point of output sub-path 1. Accordingly, input sub-path 5, internal sub-path 1, and output sub-path 1 can be combined to create signal path 510. Reviewing timing path 510, it can be seen that the dependency condition of each sub-path that is combined is carried forward in the final expression of timing path 510. Since timing path 510 begins with a register and terminates with a register forming a complete signal path.

Regarding timing path 515, it can be seen that input sub-path 6 has an ending point of "node.sum," which is the same as the starting point of output sub-path 1. Accordingly, input sub-path 6 and output sub-path 1 can be combined to create timing path 515. Reviewing timing path 515, it can be seen that the dependency condition of each sub-path that is combined is carried forward in the final expression of timing path 515. Since timing path 515 begins with an input node and terminates with a register, timing path 515 forms a setup/hold timing path.

The list of timing paths 145 specifies an exhaustive list of the possible signal paths that exist within a circuit block. Each of timing paths 145 will also have a corresponding delay that is summed from the constituent sub-paths combined to form each respective timing path. The timing paths 145, with corresponding delay information, can be stored within an electronic design automation (EDA) tool, e.g., within a database, for later recall when end users utilize the EDA tool to create circuit designs and model the timing of those circuit designs. As each timing path 145 specifies the particular dependency conditions that must be met in order to exist within the circuit design, the EDA tool can select the appropriate timing paths that are to be included in the circuit block within the user's design based upon the user-selected parameterization, e.g., the values assigned to attributes that configure the circuit block. As noted, the particular EDA tool with which the timing paths are used may be provided by the manufacturer of the programmable IC that includes the circuit block or by a third party.

FIG. 6 is a flow chart illustrating a method 600 of determining timing paths within a circuit block of a programmable IC in accordance with another embodiment of the present invention. Method 600 can be implemented by a system such as the one described with reference to FIG. 1. As such, method 600 can begin in a state where an IC designer has created a circuit block that includes one or more components that may be selectively bypassed based upon one or more user-selected attributes of the of the circuit block that can be loaded into a programmable IC within which the circuit block is disposed. Accordingly, an exhaustive listing of timing paths and delays for those timing paths is needed for inclusion within an EDA tool for use by end users that wish to utilize, analyze, and model the circuit block.

Method 600 can begin in step 605 where the system can receive a circuit block schematic. In step 610, the system can convert the circuit block schematic into a block diagram. As noted, steps 605 and 610 may be optional. In this regard, a block diagram of the circuit block alternatively may be received by the system. For example, the IC designer can manually create a block diagram representation of the circuit block and provide that block diagram to the system. In either case, the block diagram can include nodes and elements that have been labeled with the particular user-specifiable attributes that determine whether such elements are to be bypassed as well as delay information.

Continuing with step 615, the system can generate a netlist from a graphic representation of the circuit block, whether from a block diagram representation of the circuit block or a schematic diagram of the circuit block. The netlist may be specified in any of a variety of different formats, e.g., Verilog, VHDL, a custom format, or the like. In step 620, the system can generate a map file from the block diagram. As noted, the map file includes a text description of each element of the block diagram.

In step 625, the system can generate a list of sub-paths from the map file. In step 630, the system can derive timing paths from the sub-paths. As noted, sub-paths can be combined according to commonality of starting points and/or ending points. In general, each sub-path that begins or ends with an internal node can be combined with at least one other sub-path that begins or ends with an internal node until no further sub-paths beginning or ending with an internal node remain. As illustrated with regard to FIG. 5, sub-paths may be used more than one time when creating signal paths so long as each sub-path beginning or ending with an internal node is combined with at least one other node, or processed, at least one time.

The derivation of the timing paths from sub-paths, in reference to step 630, is an iterative process in which sub-paths are combined according to commonality of the starting points and/or ending points. Thus, in a larger circuit block, several sub-paths will have starting points and ending points that are internal nodes. Such sub-paths will be combined in a first pass that results in more sub-paths that have starting points and ending points that are internal nodes. Only after some number of iterations will an exhaustive list of timing paths result.

One stopping condition for this iterative process can be to set a large value of "N," where N is an integer value representing the number of iterations to be performed. The value of N, for example, can be set higher than the number of sub-paths to be combined to form the longest timing path. This can ensure convergence. Another stopping condition can include iterating until the list of paths does not change from one iteration to the next. Such a condition indicates that the iterative process has converged upon a solution. In any case, due to the iterative nature of this process, the number of iterations needed for convergence and closure will depend upon the depth of the internal paths/nodes in the circuit block.

In step 635, the system can output the timing paths as a list of timing paths. The list of timing paths and delay for each timing path can be specified in any of a variety of different formats. For example, such information can be formatted as a standard delay format file, using YAML, or the like. YAML refers to a human-friendly, cross language, Unicode based data serialization language designed around the common native data structures of agile programming languages.

The embodiments described within this specification provide an automated technique for exhaustively determining the timing paths for a parameterizable circuit block. The information generated, e.g., the timing paths and corresponding delays, can be output and used within an EDA tool intended for use by end users that may incorporate the circuit block into a user-specified circuit design within a programmable IC.

In another aspect, the embodiments described within this specification may be used during design of a circuit block in order to reduce complexity of the circuit block that is being created. In illustration, in cases where the IC designer has two or more possible ways to implement the physical circuitry of the circuit block, with each implementation being functionally equivalent, each circuit implementation may be modeled as a block diagram and processed as described herein. The circuit implementation that results in the fewest timing paths may be selected as a simplified implementation, e.g., one that has less complexity. In this manner, the IC designer can opt for the circuit block implementation that results in the fewest timing paths without sacrificing functionality.

The flowchart in the figures illustrates the architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustration, and combinations of blocks in the flowchart illustration, can be implemented by special purpose hardware-based systems that perform the specified functions or acts, or combinations of special purpose hardware and computer instructions.

Embodiments of the present invention can be realized in hardware or a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, magneto-optical media, computer memory, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, a script, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open-ended language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of identifying timing paths of a circuit block, the method comprising:
generating a map file from a graphic representation of the circuit block, wherein the map file comprises a text description of each element within the graphic representation, and wherein the text description of each element comprises a bypass indicator for the element indicating whether the element is bypassed;
generating a plurality of sub-paths from the map file at least in part according to the bypass indicators, wherein generating a plurality of sub-paths comprises including a dependency condition within each sub-path, and the dependency condition specifies a condition to be met for the sub-path to exist within the circuit block;
determining, using a processor, timing paths from the plurality of sub-paths by selectively combining different ones of the plurality of sub-paths according to commonality of starting points and ending points of the plurality of sub-paths; and
outputting the timing paths.

2. The method of claim 1, wherein determining timing paths by selectively combining different ones of the plurality of sub-paths comprises:
   selecting a first sub-path having an ending point that is the same as a starting point of a second sub-path; and
   combining the first sub-path with the second sub-path.

3. The method of claim 1, wherein generating a plurality of sub-paths comprises:
   generating at least one input sub-path comprising a starting point that is an input node of the circuit block;
   generating at least one internal sub-path comprising a starting point that is an internal node and an ending point that is an internal node of the circuit block; and
   generating at least one output sub-path comprising an ending point that is an output node or a register of the circuit block.

4. The method of claim 3, wherein determining timing paths by selectively combining different ones of the plurality of sub-paths comprises:
   identifying each sub-path comprising at least one of a starting point that is an internal node or an ending point that is an internal node as a timing path fragment; and
   determining that each sub-path comprising a starting point that is either an input node or a register and an ending point that is either a register or an output node is a timing path.

5. The method of claim 4, further comprising, for each sub-path determined to be a timing path fragment, combining the sub-path with at least one other sub-path that is a timing path fragment to form a timing path.

6. The method of claim 4, further comprising classifying each timing path as a setup/hold timing path, a combinatorial timing path, a clock-to-output timing path, or a maximum frequency timing path.

7. The method of claim 1, wherein the dependency condition is determined from the bypass indicator of an element within the sub-path.

8. The method of claim 7, further comprising:
   associating each sub-path with an estimated delay; and
   determining a delay for each timing path according to the delay of each sub-path that is combined to form the timing path.

9. The method of claim 7, further comprising, for each timing path, determining a dependency condition for the timing path according to the dependency condition of each sub-path combined to form the timing path.

10. A method of identifying timing paths of a circuit block, the method comprising:
    selecting a block diagram comprising a plurality of elements connected by nodes, wherein the block diagram represents a circuit block comprising at least one bypassable component;
    generating a map file comprising a text description of each element within the block diagram, wherein the text description of each element comprises a bypass condition for the element indicating when the element is bypassed within the circuit block according to user-specified attributes of the circuit block;
    generating a plurality of sub-paths from the map file, wherein each sub-path comprises a starting point, an ending point, a delay, and a dependency condition derived from the bypass conditions of elements within the sub-path, wherein the dependency condition specifies a condition that must be true for the sub-path to exist in the circuit block;
    determining whether each sub-path of the plurality of sub-paths is a timing path or a timing path fragment;
    selectively combining different ones of the plurality of sub-paths that are timing path fragments to form timing paths;
    for each timing path, calculating a delay for the timing path according to the delay of each sub-path within the timing path using a processor; and
    outputting the timing paths and corresponding delays.

11. The method of claim 10, wherein determining whether each sub-path of the plurality of sub-paths is a timing path or a timing path fragment comprises identifying each sub-path comprising at least one of a starting point that is an internal node or an ending point that is an internal node as a timing path fragment.

12. The method of claim 11, wherein selectively combining different ones of the plurality of sub-paths that are timing path fragments comprises:
    selecting a first sub-path having an ending point that is the same as a starting point of a second sub-path; and
    combining the first sub-path with the second sub-path.

13. A computer program product comprising:
    a non-transitory computer-usable medium comprising computer-usable program code that, when executed, identifies timing paths of a circuit block, the computer-usable medium comprising:
    computer-usable program code that generates a map file from a graphic representation of the circuit block, wherein the map file comprises a text description of each element within the graphic representation, and wherein the text description of each element comprises a bypass indicator for the element indicating whether the element is bypassed;
    computer-usable program code that generates a plurality of sub-paths from the map file at least in part according to the bypass indicators, wherein the computer-usable program code that generates a plurality of sub-paths comprises including a dependency condition within each sub-path, and the dependency condition specifies a condition to be met for the sub-path to exist within the circuit block;
    computer-usable program code that determines timing paths from the plurality of sub-paths by selectively combining different ones of the plurality of sub-paths according to commonality of starting points and ending points of the plurality of sub-paths; and
    computer-usable program code that outputs the timing paths.

14. The computer-program product of claim 13, wherein the computer-usable program code that determines timing paths by selectively combining different ones of the plurality of sub-paths comprises:
    computer-usable program code that selects a first sub-path having an ending point that is the same as a starting point of a second sub-path; and
    computer-usable program code that combines the first sub-path with the second sub-path.

15. The computer-program product of claim 13, wherein the computer-usable program code that generates a plurality of sub-paths comprises:
    computer-usable program code that generates at least one input sub-path comprising a starting point that is an input node of the circuit block;
    computer-usable program code that generates at least one internal sub-path comprising a starting point that is an internal node and an ending point that is an internal node of the circuit block; and generating at least one output sub-path comprising an ending point that is an output node or a register of the circuit block.

16. The computer-program product of claim 15, wherein the computer-usable program code that determines timing paths by selectively combining different ones of the plurality of sub-paths comprises:

computer-usable program code that identifies each sub-path comprising at least one of a starting point that is an internal node or an ending point that is an internal node as a timing path fragment; and computer-usable program code that determines that each sub-path comprising a starting point that is either an input node or a register and an ending point that is either a register or an output node is a timing path.

17. The computer-program product of claim 16, wherein the computer-usable medium further comprises computer-usable program code that, for each sub-path determined to be a timing path fragment, combines the sub-path with at least one other sub-path that is a timing path fragment to form a timing path.

18. The computer-program product of claim 13, wherein the dependency condition is determined from the bypass indicator of an element within the sub-path.

19. The computer-program product of claim 18, wherein the computer-usable medium comprises computer-usable program code that, for each timing path, determines a dependency condition for the timing path according to the dependency condition of each sub-path combined to form the timing path.

20. The computer-program product of claim 13, wherein the computer-usable medium further comprises:

computer-usable program code that associates each sub-path with an estimated delay; and computer-usable program code that determines a delay for each timing path according to the delay of each sub-path that is combined to form the timing path.

* * * * *